(12) United States Patent
Rodero et al.

(10) Patent No.: US 8,259,829 B2
(45) Date of Patent: Sep. 4, 2012

(54) METHOD FOR ESTIMATING THE TIME OF ARRIVAL IN ULTRA WIDEBAND SYSTEMS

(75) Inventors: Mónica Navarro Rodero, Barcelona (ES); Montserrat Nájar Martón, Barcelona (ES); Christian Ibars Casas, Barcelona (ES)

(73) Assignee: Fundacio Privada Centre Techologic de Telecomunicacions de Catalunya, Castelldefels (Barcelona) (ES)

( * ) Notice: Subject to any disclaimer, the term of this patent is extended or adjusted under 35 U.S.C. 154(b) by 773 days.

(21) Appl. No.: 12/442,059

(22) PCT Filed: Sep. 20, 2006

(86) PCT No.: PCT/EP2006/066529
§ 371 (c)(1),
(2), (4) Date: Mar. 19, 2009

(87) PCT Pub. No.: WO2008/034466
PCT Pub. Date: Mar. 27, 2008

(65) Prior Publication Data
US 2010/0020850 A1    Jan. 28, 2010

(51) Int. Cl.
*H04L 27/28* (2006.01)
(52) U.S. Cl. ........ 375/260; 375/130; 375/224; 375/259; 375/136; 455/59
(58) Field of Classification Search ................... 375/130, 375/224, 260, 259, 136; 455/59
See application file for complete search history.

(56) References Cited

U.S. PATENT DOCUMENTS

| | | | |
|---|---|---|---|
| 7,710,322 B1* | 5/2010 | Ameti et al. | 342/465 |
| 2003/0161543 A1 | 8/2003 | Tanaka | |
| 2004/0108954 A1* | 6/2004 | Richley et al. | 342/387 |
| 2005/0215269 A1* | 9/2005 | Cheok et al. | 455/456.1 |
| 2006/0104387 A1* | 5/2006 | Sahinoglu et al. | 375/340 |
| 2007/0016051 A1* | 1/2007 | Trucco et al. | 600/458 |
| 2007/0036241 A1* | 2/2007 | Sahinoglu et al. | 375/317 |
| 2008/0032710 A1* | 2/2008 | Guvenc et al. | 455/456.2 |
| 2008/0218403 A1* | 9/2008 | Lee et al. | 342/118 |
| 2009/0028221 A1* | 1/2009 | Sahinoglu et al. | 375/138 |
| 2009/0170458 A1* | 7/2009 | Molisch et al. | 455/226.1 |

OTHER PUBLICATIONS

Super-resolution TOA estimation with diversity for indoor geolocation, Wireless Communications, IEEE Transactions on Jan. 14, 2004, Xinrong Li; Pahlavan, K.*
International Search Report dated May 18, 2007 for the corresponding International Application PCT/EP2006/066529.
Li, et al., "Super-Resolution TOA Estimation With Diversity for Indoor Geolocation", IEEE Transactions on Wirless Communications, IEEE Service Center, Jan. 2004, pp. 225-234, vol. 3, Piscataway, NJ, US.

(Continued)

*Primary Examiner* — Kenneth Lam
(74) *Attorney, Agent, or Firm* — Katten Muchin Rosenman LLP

(57) ABSTRACT

Method and device for estimating the time-of-arrival of a received signal y(t), said method comprising the step of: generating a plurality of frequency-domain samples from the received signal y(t); estimating a correlation matrix (Formula I) from said plurality of frequency-domain samples; from said correlation matrix (Formula I), calculating a signal energy distribution with respect to different propagation delays; finding a delay value (Formula II) at which said signal energy distribution exceeds a certain threshold $P_{th}$, said delay value representing the time-of-arrival estimation.

20 Claims, 8 Drawing Sheets

OTHER PUBLICATIONS

Alsindi, et al., "Performance of TOA Estimation Algorithms in Different Indoor Mulipath Conditions", Wireless Communications and Networking Conference, Mar. 2004, pp. 495-500, vol. 1, IEEE Communications Society, Piscataway, NJ, US.

Somayazulu, et al., "Design Challenges for Very High Data Rate UWB Systems", 2002, pp. 717-721, IEEE.

Lee, et al., "Ranging in a Dense Multipath Environment Using a UWB Radio Link", Dec. 2002, pp. 1677-1683, vol. 20, IEEE Journal on Selected Areas in Communications.

Gezici, et al., "A Two-Step Time of Arrival Estimation Algorithim for Impulse Radio Ultra Wideband Systems", Dec. 2005, Mitsubishi Electric Research Laboratories, Inc., Cambridge, Massachusettes, US.

Guvenc, et al., "Threshold-Based TOA Estimation for Impulse Radio UWB Systems", pp. 420-425, Mitsubishi Electric Research Labs, Cambridge, MA, Department of Electrical Engineering, University of South Florida, Tampa, FL.

Cheong, et al., "Synchronization, TOA and Position Estimation for Low-complexity LDR UWB Devices", pp. 480-484, Centre for Wireless Communications, University of Oulu, Finland.

* cited by examiner

METHOD FOR ESTIMATING THE TIME OF ARRIVAL IN ULTRA WIDEBAND SYSTEMS

FIELD OF THE INVENTION

The present invention relates to the estimation of the time-of-arrival (ToA) of signals transmitted through a wireless medium. More precisely, the present invention relates to the estimation of the ToA of signals in ultra wideband (UWB) systems.

STATE OF THE ART

Communication systems based on impulse radio ultra wideband (IR-UWB) have been envisaged as radio communication systems that could enable very accurate ranging and location applications, given the extremely short duration pulses. This high time resolution nature of the UWB signal makes ToA estimation method a good candidate for positioning estimation in UWB communications.

Time-based positioning techniques rely on measurements of the propagation time undertaken by the signal when travelling between a target node and a reference node. This typically requires a minimum of three reference nodes to estimate the position in a two-dimensional space.

For ranging applications a single reference node is sufficient. Ranging accuracy depends on how precisely the receiver can discriminate the first arriving signal, which in a multipath environment may not be the strongest. Currently, most of the known ranging techniques are based on time-domain ToA estimation methods. The maximum likelihood (ML) solution has practical limitations due to the requirement of very high sampling rates. The conventional correlation-based approach described by V. Somayazulu, J. R. Foerster and S. Roy ["Design challenges for very high data rate uwb systems", in Asilomar Conference on Signals, Systems and Computers] results in a very slow TOA estimator requiring an exhaustive search over a large number of bins. Iterative ML approaches have also been studied by J. Y. Lee and R. Scholtz ["Ranging in dense multipath environment using uwb radio links", IEEE J. Selected Areas Commun., vol. 20, no 9, December 2002], but yet requiring very high rate sampling.

Recently, proposals to reduce the sampling constraints and time intervals required for estimation of time-domain based ToA estimators have appeared in the literature. An approach addressed by S. Gezici, Z. Sahinoglu, A. Molisch, H. Kobayashi and V. Poor ["A Two-Step ToA Estimation Algorithm for Impulse Radio UWB Systems, Mitsubishi Electric Research Laboratories, December 2005] consists on a two step ToA estimation process consisting of an initial coarse estimation of the ToA followed by a higher resolution stage. Following this strategy, a first rough ToA estimate based on the received signal energy is followed by a low-rate correlation stage that estimates the ToA based on hypothesis testing. A similar two-step estimator is proposed by I. Guvenc and Z. Sahinoglu ["Threshold-based ToA estimation for impulse radio uwb systems", IEEE International Conference on Ultra-wideband], based on a threshold-based energy detection receiver. The scheme allows for a symbol rate sampling but requires using several symbols and an appropriate design of the signal waveform. A further two stage approach is considered by P. Cheong, A. Rabbachin, J. Montillet, K. Yu and I. Oppermann ["Synchronization, toa and position estimation for low-complexity ldr uwb devices", IEEE International Conference on Ultra-Wideband], who describes a non-coherent receiver based on an energy detection stage, based on integration windows which time resolution changes between the two stages. A critical parameter for these estimators lies on the threshold selection.

In summary, most of the known techniques on ranging applications in UWB communications systems are based on time domain techniques for time-of-arrival estimation. However, time domain approaches suffer mainly from (a) practical limitations of maximum likelihood solution due to the requirement of very high sampling rates and (b) large estimation time of correlation-based approaches due to the required search over a large number of bins.

SUMMARY OF THE INVENTION

It is therefore an object of the present invention to provide a method for the time-of-arrival (ToA) estimation of a signal transmitted through a wireless system which is based on a frequency domain approach. This allows sub-Nyquist sampling rates while achieving high ranging accuracy. Thus, the time-of-arrival is estimated from the frequency domain sampled signal. Therefore, this low complexity ToA estimation method solves the problems derived from known ToA estimation methods.

In particular, it is an object of the present invention a method for estimating a time-of-arrival of a received signal y(t), said method comprising the step of: generating a plurality of frequency-domain samples from the received signal y(t); estimating (41) a correlation matrix $\hat{R}_{YY}$ from said plurality of frequency-domain samples; from said correlation matrix $\hat{R}_{YY}$, calculating a signal energy distribution with respect to different propagation delays; finding a delay value at which said signal energy distribution exceeds a certain threshold $P_{th}$, said delay value representing the time-of-arrival estimation.

Said received signal is preferably an ultra-wideband signal, and most preferably an impulse radio ultra-wideband signal. In this case, the step of estimating a correlation matrix from a plurality of frequency-domain samples is carried out by means of exploiting the temporal diversity of said impulse radio ultra-wideband signal.

Said signal energy distribution is preferably given by the computation of a pseudo-periodogram.

Said step of finding said delay value can be done by exhaustively evaluating the signal energy distribution at a plurality of values of the propagation delay.

Alternatively, said step of finding said delay value is done by calculating the roots of a polynomial.

The step of generating a plurality of frequency-domain samples from the received signal y(t) is preferably done by: splitting the received signal y(t) into a plurality of bands by filtering said received signal by band-pass filters with approximately Gaussian frequency response; sampling the output of each of the band-pass filters thereby obtaining a plurality of samples; from said plurality of samples, building a vector S; from said vector S, creating a vector S'; creating a vector Y which is the concatenation of vector S, a vector of zeros of size Q, where $Q \geq 1$ and vector S'.

It is another object of the present invention to provide a device for estimating the time-of-arrival (ToA) of a signal transmitted through a wireless system, which comprises means adapted for carrying out the steps of the method for the time-of-arrival (ToA) estimation. In particular, the device for ToA estimation is preferably based on UWB receiver architectures that provide direct samples of the received signal in the frequency domain at sub-Nyquist sampling rate.

Finally, it is a further object of the present invention to provide a computer program.

The advantages of the proposed invention will become apparent in the description that follows.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures.

DETAILED DESCRIPTION OF THE INVENTION

Definitions

Figure 1A:
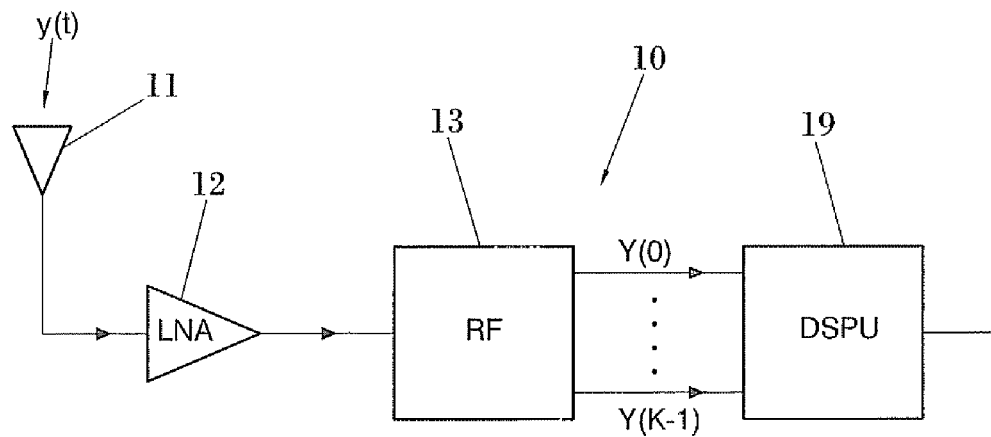
FIG. 1A shows a block diagram of a frequency-domain sampling (FDS) receiver (10) according to an embodiment of the present invention.

In the context of the present invention, the term "approximately" and terms of its family (such as "approximate", "approximation", etc.) should be understood as indicating values or forms very near to those which accompany the aforementioned term. That is to say, a deviation within reasonable limits from an exact value or form should be accepted, because the expert in the technique will understand that such a deviation from the values or forms indicated is inevitable clue to measurement inaccuracies, etc. The same applies to the term "nearly" and "Gaussian-like".

Furthermore, the term "pseudo" has been employed accompanying terms such as "spectrum" or "periodogram". Thus, the expressions "pseudo-spectrum" and "pseudo-periodogram" are used. The term "pseudo" is used because the terms "spectrum" and "periodogram" are normally used in the frequency domain. For example, the "spectrum" normally denotes de distribution of energy in the frequency domain. However, in the context of the present invention, we refer to "spectra" and "periodograms" in the temporal domain, more precisely, in the domain of temporal delays In order to emphasize the use of these terms in a domain which is not the typical one for said terms, we have employed the term "pseudo".

In this text, the term "comprises" and its derivations (such as "comprising", etc.) should not be understood in an excluding sense, that is, these terms should not be interpreted as excluding the possibility that what is described and defined may include further elements, steps, etc.

Signal Model

Although this invention is not limited to the particular structure of impulse radio (IR) ultra wideband (UWB) signals, next a signal model of IP-UWB signals is introduced.

Ultra wideband signals based on impulse radio (IR) transmission consist of baseband impulses of very short duration, typically of about 100 picoseconds. A single information symbol is typically implemented by the repetition of $N_p$ pulses of very short duration, $$s(t) = \sum_{p=0}^{N_p-1} \sqrt{E_p} \, p(t - pT_{pr}) \quad (1)$$

where $E_p$ denotes the pulse energy, p(t) refers to the single pulse waveform, typically a Gaussian monocycle or its derivatives and $T_{pr}$ is the repetition pulse period.

Modulation and time hopping can be explicitly included in the pulse waveform such us $p(t)=p_s(t-b_iT_\Delta-c_i^P T_c)$ with $p_s(t)$ being typically a Gaussian monocycle or its derivatives, $b_i$ the information symbol, $T_\Delta$ the modulation time shift, $c_i^P$ the time hopping sequence and $T_i$ the chip interval.

Assuming that the channel is modelled by a summation of impulses (Dirac Delta function), the received signal y(t) through a multipath fading channel is a sum of multiple delayed and attenuated replicas of the transmitted signal s(t), where $h_m$ and $\tau_m$ respectively denote the fading coefficient and the delay for the m-th path and v(t) is the contribution of the additive Gaussian noise:

$$y(t) = \sum_{p=0}^{N_p-1} \sum_{m=1}^{M} h_m \sqrt{E_p} \, p(t - pT_{pr} - \tau_m) + v(t) \quad (2)$$

Transforming the signal to the frequency domain, $$Y(\omega) = \sum_{p=0}^{N_p-1} \sum_{m=1}^{M} h_m \sqrt{E_p} \, P(\omega) e^{-j\omega pT_{pr}} e^{-j\omega \tau_m} + V(\omega) \quad (3)$$

where $Y(\omega)$, $P(\omega)$ and $V(\omega)$ denote the Fourier transform of respectively the received signal, the transmitted pulse and the additive Gaussian noise.

Rearranging this formula into matrix notation, the sampled received signal can be written as $$Y = \sqrt{E_p} \sum_{p=0}^{N_p-1} P_p E_\tau h + V \quad (4)$$

where:

the elements of vector $Y \in \mathbb{C}^{K \times 1}$, $Y(\omega_k)$, are the discrete Fourier transform (DFT) components of y(t) with $\omega_k = k\omega_0$ for k=0,1,...,K-1 and $\omega_0 = 2\pi/K$;

$P_p$ is a diagonal K×K matrix (same size as DFT) that contains the DFT components of the pulse waveform p(t) shifted by a frequency factor $e^{-j\omega pT_{pr}}$;

h=[$h_1 \ldots h_M$]$^T$ is the fading coefficients vector having M×1 size. "T" denotes the "transpose matrix". Each element of this vector is, in general, a complex number which represents the channel attenuation associated to the multipath.

V∈$C^{K \times 1}$ is the noise vector, wherein C denotes that its elements are complex numbers; its size is K×1; and $E_\tau$ is a K×M matrix, which denotes the delay-signatures for each delayed signal:

$E_\tau$=[$e_{\tau_1} \ldots e_{\tau_j} \ldots e_{\tau_M}$], with column vectors $e_{\tau_j}$=[1 $e^{-j\omega_0\tau_j} \ldots e^{-j\omega_0(K-1)\tau_j}$]$^T$. K is the size of the DFT and M is the number of multipaths which are taken into account.

Description of the Receiver

FIG. 10A shows a block diagram of a frequency domain sampling (FPS) receiver (10) according to the present invention. Receiver (10) comprises a receiving antenna (11) followed by an amplifier, typically a wideband low noise amplifier (LNA) (12). After said amplifier (12), a radio frequency (RE) front-end (13) is located, followed by a digital signal processing unit (DSPU) (19). The radio frequency (RE) front-end (13) provides the digital signal processing unit (DSPU) (19) with a set of samples in the frequency domain (Y(0), Y(1), . . . , Y(K−1)).

Since one of the objects of the present invention is a method for estimating the time of arrival of a signal transmitted through a wireless medium, based on a receiver which provides direct samples of the received signal in the frequency domain, any radio frequency (RF) front-end (13) which is able to provide the digital signal processing unit (19) with a set of samples in the frequency domain (Y(0), Y(1), . . . , Y(K−1)) can be used.

Figure 1B:
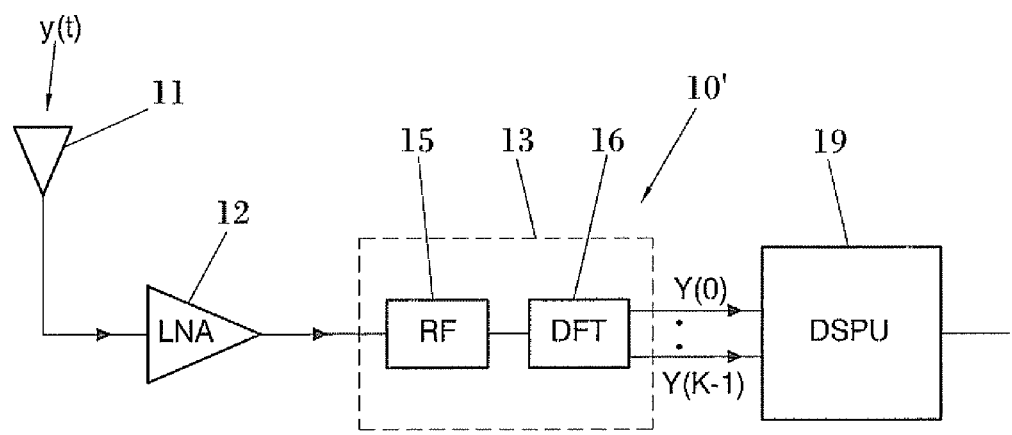
FIG. 1B shows a block diagram of a frequency-domain sampling (FDS) receiver (10') according to an embodiment of the present invention.

If the RF front end provides a signal in the time domain, an intermediate stage performing the Discrete Fourier Transform of such signal is necessary. A block diagram of such a receiver (10') is shown in FIG. 1-B, where reference 15 refers to any RE front-end providing a time domain digital signal and reference 16 refers to a digital block performing the Discrete Fourier Transform.

Figure 2:
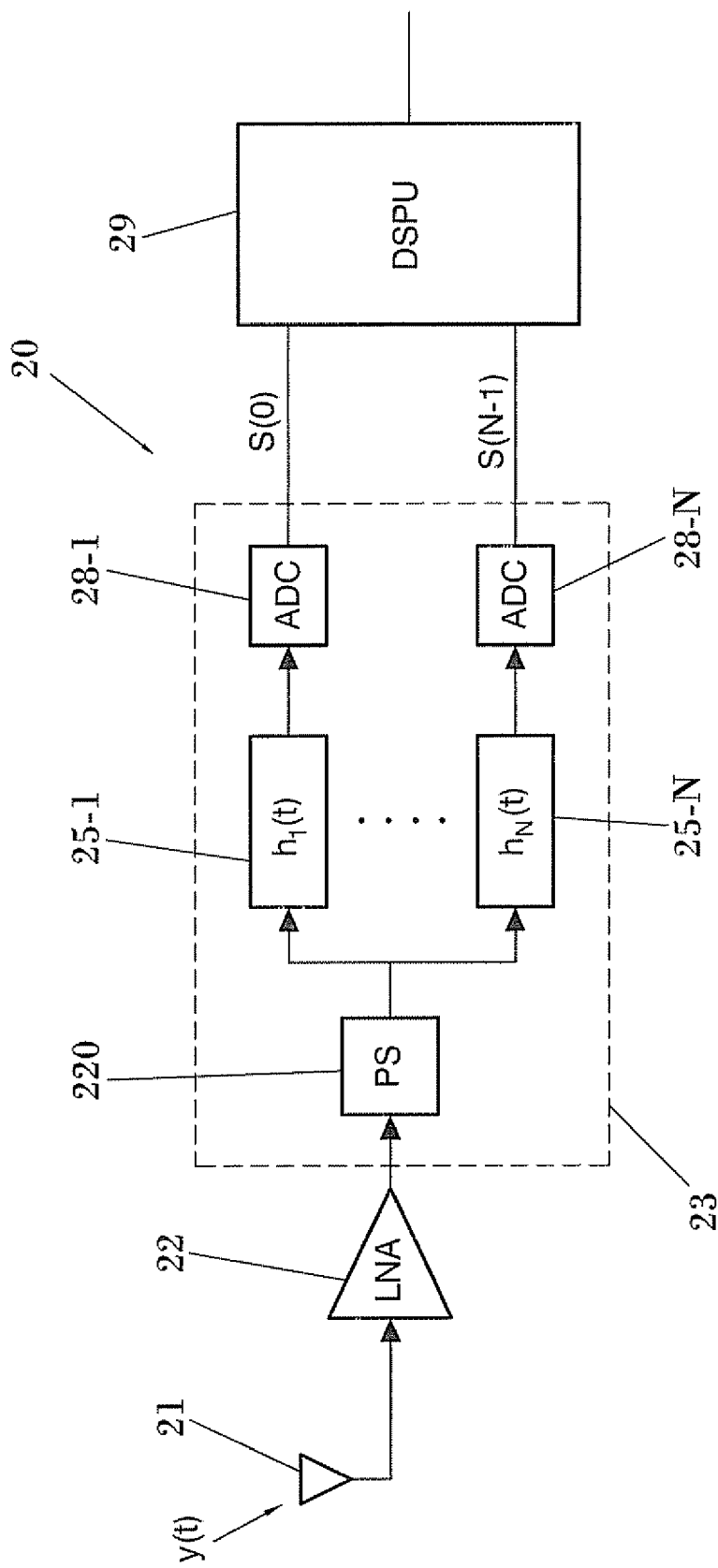
FIG. 2 shows a block diagram of a frequency-domain sampling (FDS) receiver (20) according to a preferred embodiment of the present invention.

FIG. 2 shows a block diagram of a frequency-domain sampling (FDS) receiver (20) according to a preferred embodiment of the present invention. The FDS receiver (20) of FIG. 2 samples, at Nyquist rate, the signal only in the frequency bands of interest. A receiver in the time domain must sample the entire signal at Nyquist rate, which results in a higher overall sampling rate. Therefore, this preferred embodiment requires lower sampling clock frequencies than time-domain sampling (TDS) receivers. Similar to receiver (10) or (10'), receiver (20) comprises a receiving antenna (21), an amplifier, typically a wideband low noise amplifier (LNA) (22), followed by a radio frequency (RE) front-end (23) which, in turn, is followed by a digital signal processing unit (DSPU) (29).

In this preferred embodiment of the present invention, the RE front-end (23) comprises a power splitter (PS) (220), a filter bank (25-1, 25-2, . . . , 25-N) and an analog-to-digital (ADC) conversion stage (28-1, 28-2, . . . , 28-N). The power splitter (220) splits the received signal into N branches. Each of said branches enters one of the filter banks bandpass filters (25-1, 25-2, . . . , 25-N), which delivers the signal filtered at the corresponding sub-band. As a result, the filter bank decomposes the received signal into N equally spaced, nearly orthogonal frequency bands representing the spectral components of the received signal. The frequency domain decomposition is based in the discrete Short Time Fourier Transform (STFT), which can decompose a signal in an orthogonal basis.

The discrete STFT of a signal x(t) is defined as:

$$STFT(n,m) = \int_{-\infty}^{\infty} x(t)\gamma_{n,m}^*(t)dt$$

where γn,m(t) are the STFT basis functions. Typically, the STET basis functions consist of a window function translated in both time and frequency. By properly choosing the window function and translation intervals, a set of orthogonal frequency bands can be obtained. In the described receiver implementation, $\gamma_{n,m}(t)$ corresponds to the $n^{th}$ band filter, delayed by m times the sampling period. In order to obtain the STET coefficients, STFT(n,m), one must sample each filter output at time intervals spaced by m times the sampling period. This operation is performed by the analog-to-digital (ADC) conversion stage (28-1, 28-2, . . . , 28-N), which samples the measured spectral components delivered by the filter bank (25-1, 25-2, . . . , 25-N).

Finally, a digital signal processing unit (DSPU) (29), which will be described in detail later, performs signal detection, synchronization and channel equalization in the frequency domain.

The receiver can be designed with any number of filters in the filter bank (25-1, 25-2, . . . , 25-N), provided that a physical implementation is feasible. The number of filters in the filter bank determines the dimension of the ToA estimator, since it determines the dimension of vector S, which will be introduced later in this description. In addition, since the signal bandwidth is constant, the number of filters determines the filter bandwidth, which in turn determines the sampling rate of the ADC stages (28-1, 28-2, . . . , 28-N). Nevertheless, the overall sampling rate at which the receiver (20) operates remains constant, since it is given by the sum of the sampling rates of all ADC stages (28-1, 28-2, . . . , 28-N).

In a system with a signal bandwidth of W, the frequency spacing Δf between the N filters (25-1, 25-2, . . . , 25-N) is given by:

$$\Delta f = \frac{W}{N-1} \qquad (5)$$

Each filter (25-1, 25-2, . . . , 25-N) measures one in-band spectral component during an interval of $T_a$=1/Δf (sampling period). The ADC conversion stage (28-1, 28-2, . . . , 28-N) samples the filter outputs at a rate $F_m$=1/$T_a$ (sampling frequency) to avoid time-domain aliasing. The observation samples after the ADC conversion operation are the N spectral components of the received signal, which are grouped in a vector S=[S(0) . . . S(N−1)]$^T$ of size 1×N, and wherein "T" denotes "transpose matrix". Given the symmetry of the discrete time Fourier transform of signal y(t), an estimated K-length frequency response is formed by appending the observation frequency samples of vector S with themselves in reversed order and zero padding at the extreme and central sampled positions, as follows:

$$Y=[0 \ldots 0 \; S^T \; 0 \ldots 0 \; S'^T \; 0 \ldots 0]^T \qquad (6)$$

where S'=[S(N−1) . . . S(0)]$^T$. The minimum number of measured spectral components in the frequency-domain sampling (FDS) approach is given by:

$$N=\lceil WT_a+1 \rceil \qquad (7)$$

Figure 4:
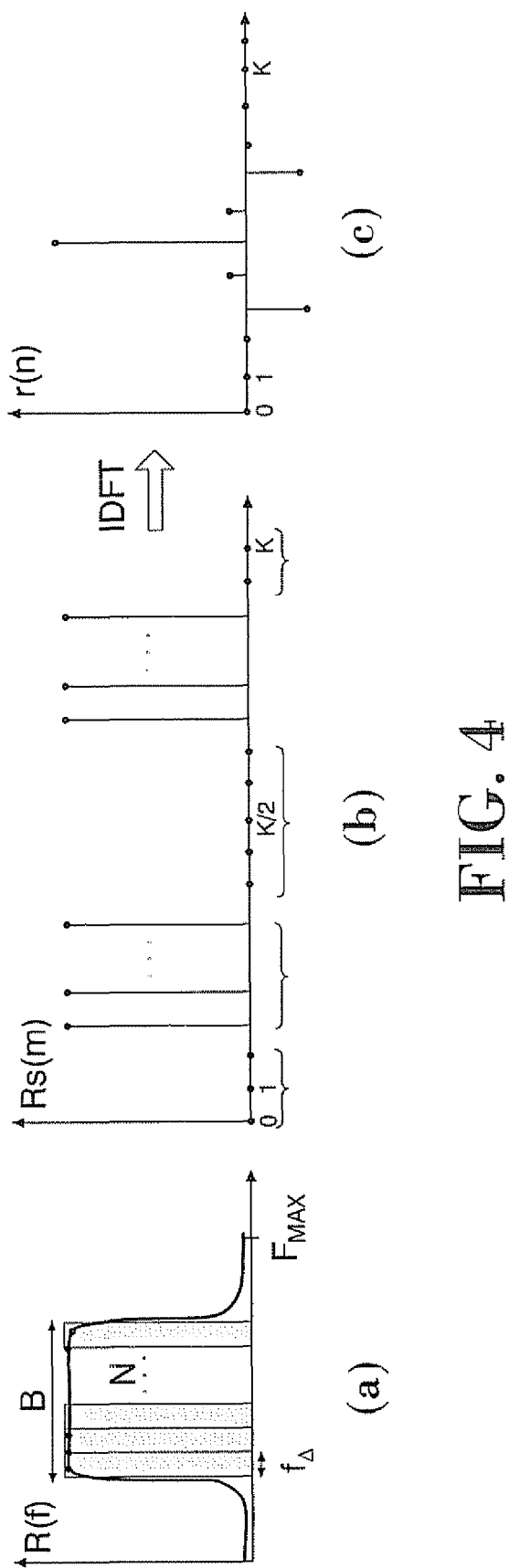
FIG. 4 shows some frequency domain sampling examples.

FIG. 4 shows some frequency domain sampling examples:

FIG. 4(a) shows the analogical, frequency domain spectrum of a signal r(t). In the ordinates axis the frequency response R(f) is represented, while in the abcisses axis the frequency domain $f_A$ is represented.

FIG. 4(b) shows the discrete-time frequency response Rs(m) of the same signal (after time sampling of the received signal and performing a Discrete Fourier Transform (DFT). Abcisses axis represents the values of the discrete frequency ω, wherein ω=2π/K. Rs(m) is a periodic signal.

FIG. 4(c) shows the estimated discrete time signal in the time domain, after performing an Inverse Discrete Fourier transform (IDF). Ordinates axis represents the temporal signal r(n) and abcisses axis represents the temporal samples (n).

As explained before, any radio frequency (RF) front-end (13, 23) which is able to provide the digital signal processing unit (19, 29) with a set of samples in the frequency domain can be used. However, using a RF front-end (23) based on an analog stage which comprises a filter bank (25-1, 25-2, ..., 25-N) like the one which has just been proposed (FIG. 2) provides the advantage of incurring in lower complexity of implementation, since the ADC conversion stages (28-1, 28-2, ..., 28-N) need a lower sampling frequency. A second advantage of this approach lies on the fact that this RF front-end directly provides the frequency samples which are needed for the ToA estimation, without requiring a time to frequency conversion.

Figure 3:
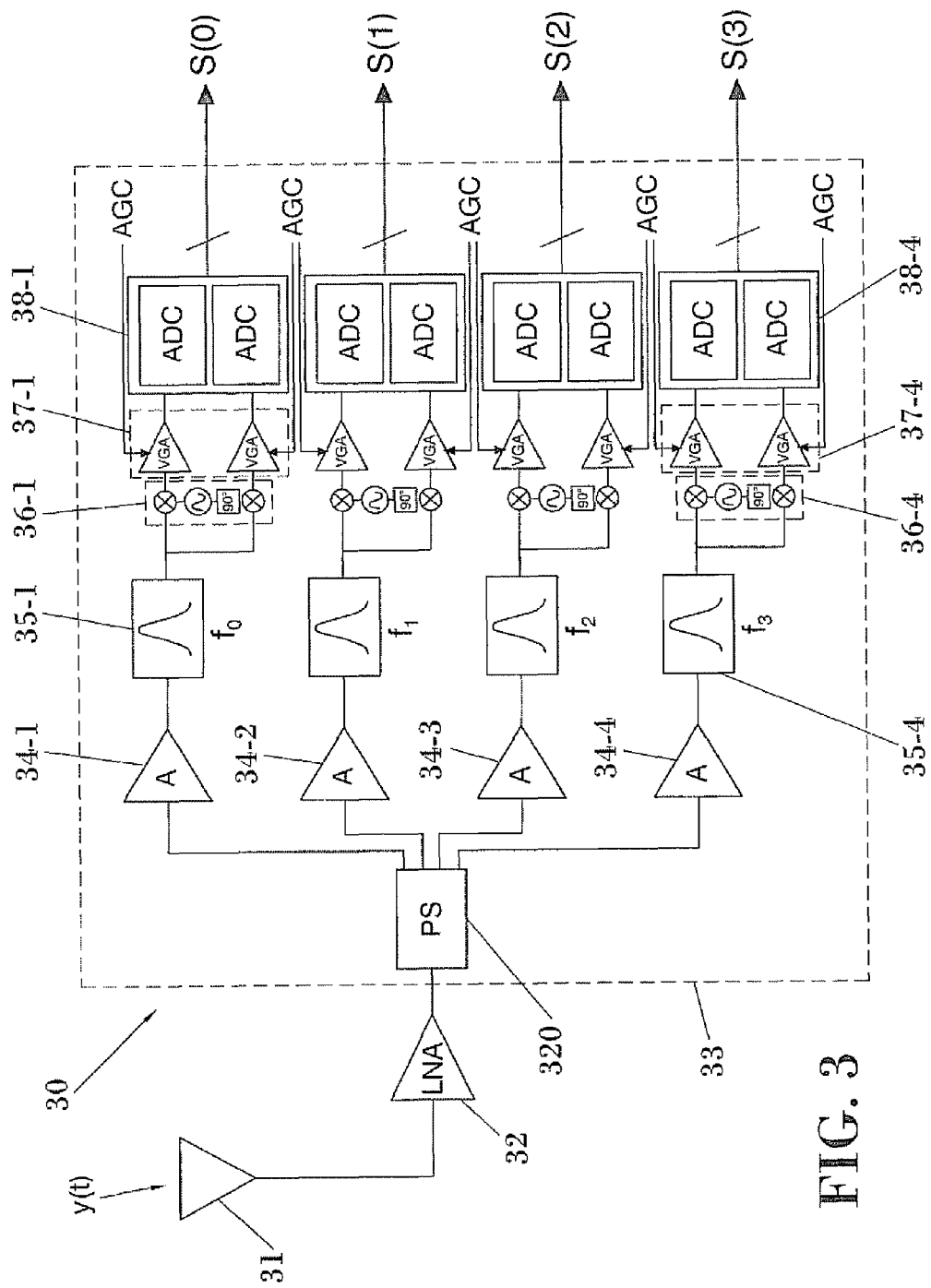
FIG. 3 shows an example of a particular implementation of the receiver according to the preferred embodiment of the present invention.

As a way of example, which must not be considered as a limitation of the present invention, FIG. 3 shows a possible implementation of the receiver (30) according to this preferred embodiment, capable of sampling an impulse radio ultra wideband (IR UWB) signal. The receiver (30) comprises a receiving antenna (31), a wideband low noise amplifier (32) and a RF front-end (33). This RF front-end (33) comprises a power splitter PS (320), a second amplifier stage (34-1, 34-2, ..., 34-4), a band of band-pass filters (35-1, 35-2, ..., 35-4), a down conversion stage for in-phase and quadrature signals (36-1, 36-2, ..., 36-4), a third amplifier stage (37-1, 37-2, ..., 37-4), which comprises variable gain amplifiers (VGA) with automatic gain control (AGC) input and an analog-to-digital (ADC) conversion stage (38-1, 38-2, ..., 38-4). The digital signal processing unit (DSPU) which follows the ADC conversion stage is not represented in FIG. 3. The receiver (30) can implement a nearly orthogonal, discrete STFT as defined earlier. The discrete STFT coefficients are obtained by periodically sampling the output of each filter. The 4 bandpass filters shown (35-1, 35-2, ..., 35-4) are designed with a Gaussian-lice frequency response, wherein each filter has a bandwidth of approximately 500 MHz approximately centered at the following frequencies $f_0$, $f_1=f_0+1$ GHz, $f_2=f_1+1$ GHz, and $f_3=f_2+1$ GHz. As a result, the basis is nearly orthogonal and does therefore not require phase synchronization of all filters, which is hard to obtain in practice. Also as a way of example, the sampling rate of the ADC conversion stage can be chosen to be 1 Gigasample per second, i.e., Nyquist rate. The digital signal processing unit (DSPU) processes the 4 channels to reconstruct the received signal and implements the signal detection and time-of-arrival estimation algorithms, as will be explained later in this description.

Description of the Digital Section of the Receiver

Figure 5A:
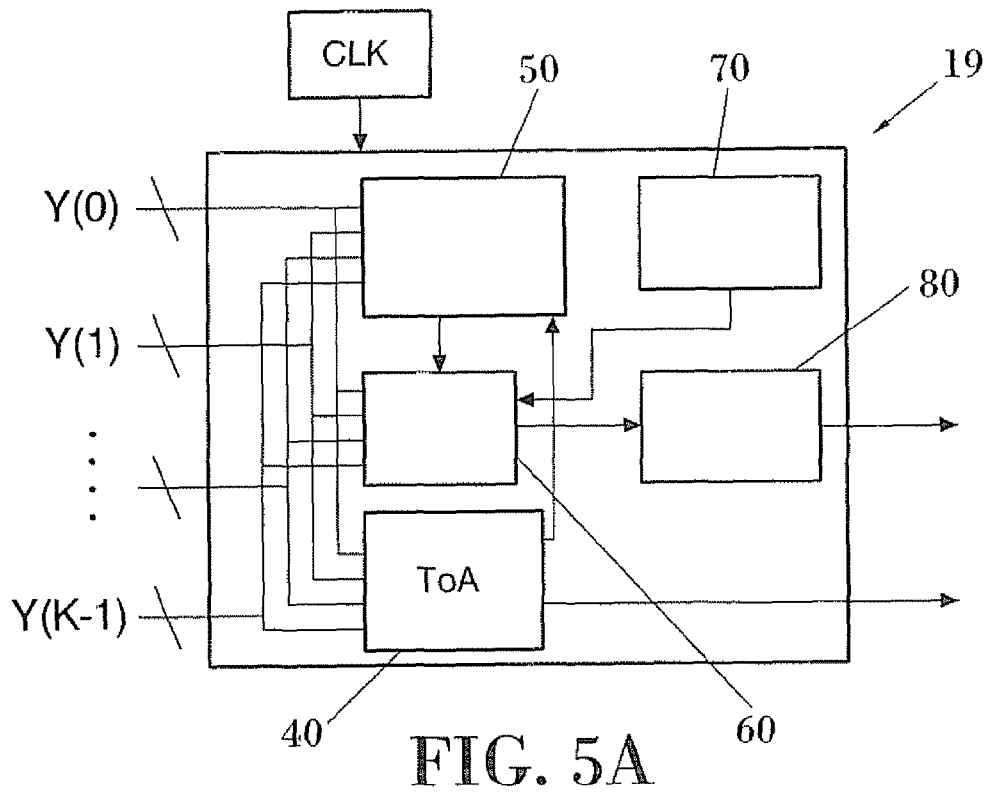
FIG. 5A shows a block diagram of the digital section of a receiver according to an embodiment of the present invention.
Figure 5B:
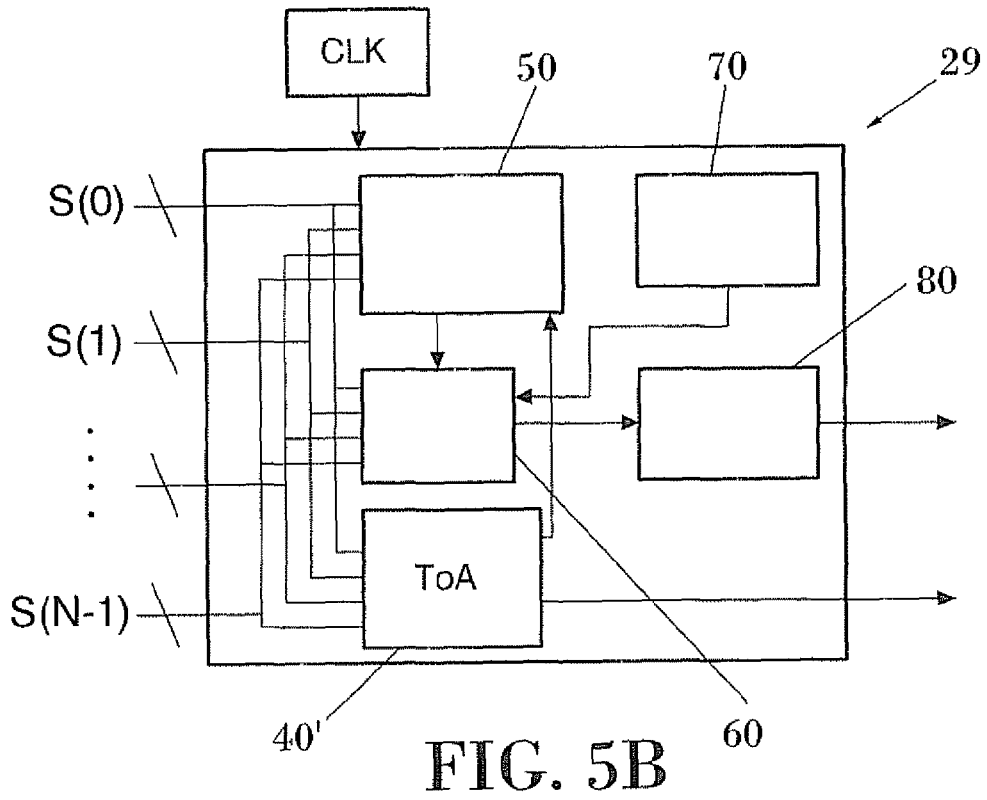
FIG. 5B shows a block diagram of the digital section of a receiver according to an embodiment of the present invention.

FIGS. 5-A and 5-B show a block diagram of a possible implementation of the digital signal processing unit (DSPU) (19, 29) of the receiver (10, 10', 20, 30). The only difference between the DSPU (19) (FIG. 5-A) and the DSPU (29) (FIG. 5-B) is that the first one (19) corresponds to a receiver (10, 10') whose REF front-end (13) provides at its output a set of K samples in the frequency domain (Y(0), Y(1), ..., Y(K−1)), while the second one (29) corresponds to a receiver (20, 30) whose RF front-end (23, 33) provides at its output a set of N samples in the frequency domain (S(0), S(1), ..., S(N−1)), wherein K>2N (see equation (6)). In other words, DSPU (29) (FIG. 5-B) takes advantage of a radio frequency front end (23, 33) which incurs in lower complexity of implementation than the other one (13), as already explained. The DSPU (19, 29) comprises the following functional blocks:

means (40, 40') for estimating the time-of-arrival (ToA), which carries out a ToA estimation algorithm for obtaining the time delay of the received signal with respect to a local time basis. The estimated time delay, which is performed in the transformed domain, yields a ranging estimate and is used, among others, for timing acquisition to synchronize the receiver (10, 10', 20, 30);

means (50) for estimating the channel, which carries out channel estimation algorithms. The estimated channel response corresponds to the combination of the channel impulse response and the transmitting and receiving antennae distortion. This means (50) obtains the coefficients corresponding to a matched filter of the receiver;

a matched filter (60), which multiplies the received signal vector with the conjugate of the estimated channel impulse response. The multiplication is performed in the transform domain. In addition, the matched filter (60) also combines the multiple received pulses according to the time-hopping sequence. Its output is a symbol-rate signal;

a time hopping (TH) sequence generator (70), which obtains the time-hopping sequence used to modulate the transmitted pulses;

means (80) for implementing demodulating and decoding algorithms in order to obtain the information bits from the output of the matched filter (60).

In the following section, the means (40) and method for ToA estimation according to the present invention is described in detail.

Time-of-Arrival (ToA) Estimation

In this section, the method for ToA estimation according to the present invention is described. Its application is intended for use at several processing blocks in the receiver (10, 10', 20, 30), such as ranging estimation, positioning location and timing synchronization.

The receiver architecture has a significant impact in the choice of the ranging technique. The estimation problem resorts then to estimate the ToA from the frequency domain sampled signal as delivered from the radio frequency front end (13, 23, 33). As already explained, depending on the architecture of the RF front end (13, 23, 33), a reduced set of samples (S(0), S(1), ..., S(N−1)) is obtained (FIGS. 2, 3) or a complete set of K samples (Y(1), Y(1), ..., Y(K−1)) is obtained.

According to an embodiment of the present invention, represented in FIG. 5-A, a vector Y is directly formed from the K samples delivered from the radio frequency front end (13). As shown in FIG. 5-A, this vector Y is the input of block 40, which is the block responsible for the time of arrival estimation. Block 40 is detailed in FIG. 6-A.

According to another embodiment of the present invention, in which the radiofrequency front-end (23, 33) provides a reduced set of samples (S(0), S(1), ..., S(N−1)) (FIGS. 2, 3), a vector S=[S(0) ... S(N−1)] is the input; of block 40' (FIG.

Figure 6A:
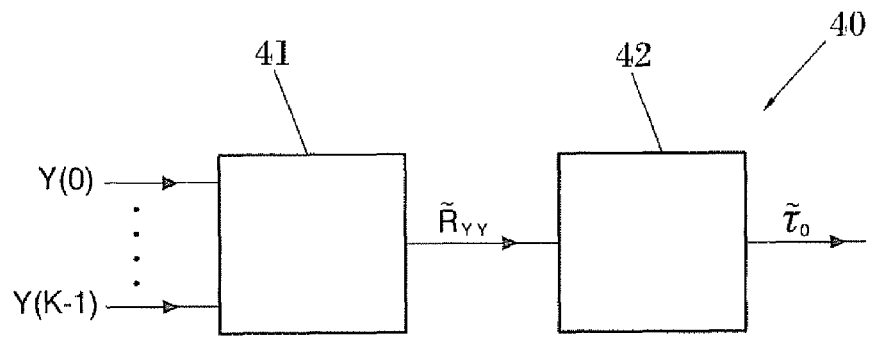
FIG. 6A shows a ToA estimation scheme according to an embodiment of the present invention.
Figure 6B:
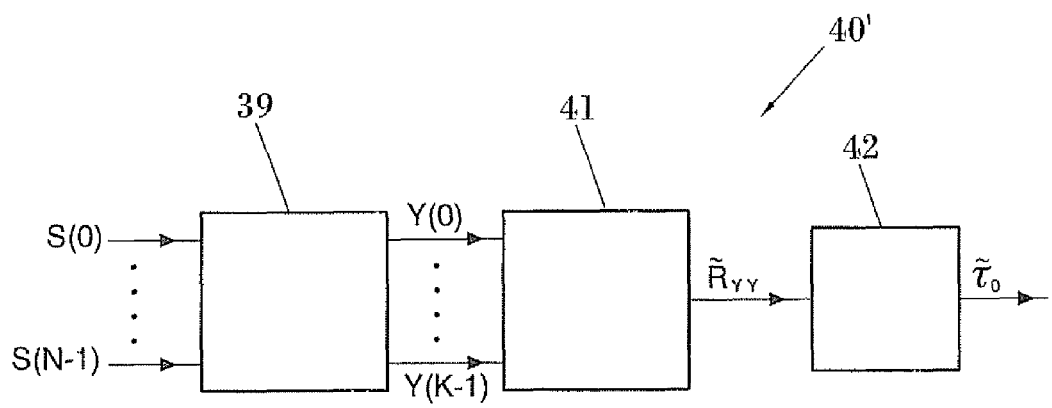
FIG. 6B shows a ToA estimation scheme according to an embodiment of the present invention.

5-B) Block 40' is detailed in FIG. 6-B, which differs from FIG. 6-A in that a block 39 is needed for creating a vector Y (formed by K elements). In a particular embodiment, vector Y comprises 2N+1 elements. The outputs of the N ADC (28-1, ..., 28-N; 38-1, ..., 38-N) form a vector S=[S(0) ... S(N-1)]. If a vector S' is created, such as S'=[S(N-1) ... S(0)], then vector Y: Y=[S 0 S']$^T$ comprises K=2N+1 elements, K being the size of the FFT. By zero padding the size of the DFT can be increased, thereby obtaining a higher value of K, as previously shown in equation (6).

The estimation algorithm according to the present invention is based on the definition of the pseudo-spectrum as the signal energy distribution with respect to propagation delays (temporal delays). The temporal pseudo-spectrum amplitude at each time or propagation delay can be obtained by estimating the energy of the signal filtered by the delay-signature vector at said time delay defined as $e_\tau = [1 \; e^{-j\omega_0\tau} \; ... \; e^{-j\omega_0(K-1)\tau}]^T$. Then, the pseudo-spectrum yields the quadratic form $e_\tau^H R_{YY} e_\tau$ defined as pseudo-periodogram, wherein $R_{YY}$ is the correlation matrix defined as $R_{YY}=E[YY^H]$, where E[.] denotes the expected value.

The estimation algorithm comprises the following steps: estimation of the correlation matrix, denoted as $\tilde{R}_{YY}$, from the frequency domain samples (Y(0),Y(1), ...,Y(K-1)); calculation of a temporal pseudo-spectrum P($\tau$) from said estimated correlation matrix; finding a delay value ($\tilde{\tau}_0$) that exceeds a given threshold in the temporal pseudo-spectrum.

FIGS. 6-A and 6-B show a ToA estimation scheme (40, 40') according to the present invention. Once obtained vector Y, the ToA estimation method comprises a first stage (41) for estimating the correlation matrix $\tilde{R}_{YY}$ and a second stage (42) for calculating the ToA.

In the first stage (41), the correlation matrix of the sampled signal in the frequency domain (Y(0),Y(1), ...,Y(K-1)) is calculated from the observations of the received signal.

Figure 9:
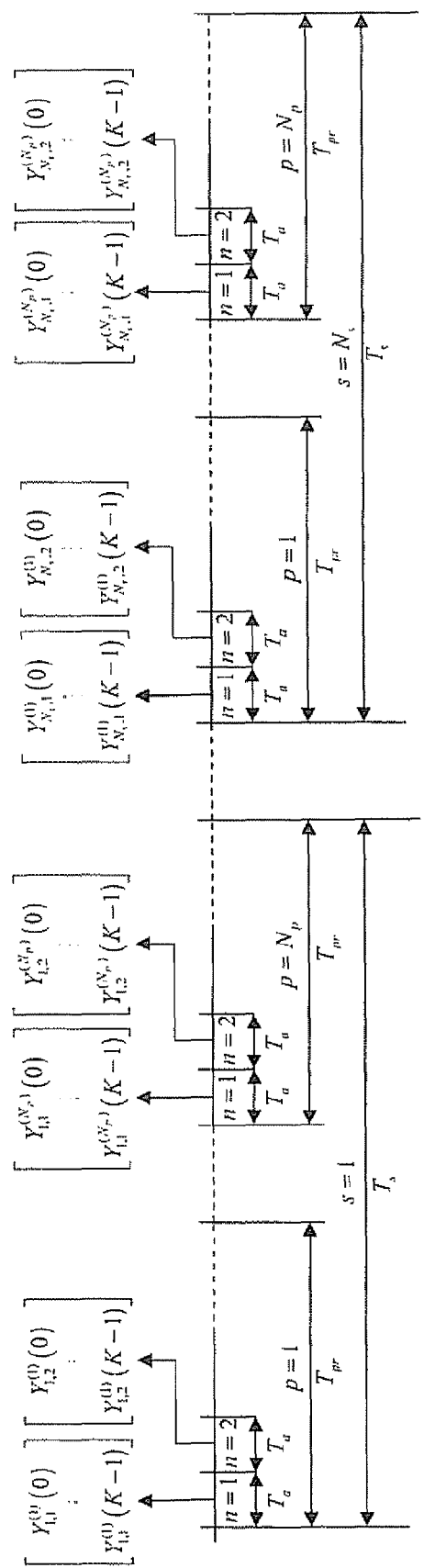
FIG. 9 shows the signal samples obtained at the output of the ADC stage.

Considering that a plurality of $N_s$ signal realizations are observed (for instance, one signal realization may be the transmission of one data symbol of $T_s$ seconds), the correlation matrix corresponding to each sampling interval of $T_a$ seconds can be estimated averaging the observation vectors corresponding to said sampling interval over the $N_s$ realizations. For each sampling interval n, a plurality of $N_s$ observation vectors ($Y_{1,n} \; Y_{2,n} \; ... \; Y_{N,n}$) can be defined denoting $Y_{s,n}=[Y_{s,n}(0) \; Y_{s,n}(1) \; ... \; Y_{s,n}(K-1)]^T$ as the observation vector corresponding to the s-th realization, at sampling interval n, which composed of the K frequency samples. This is illustrated in FIG. 9. From said plurality of observation vectors, the correlation matrix is estimated for each sampling interval n:

$$\tilde{R}_{YY}(n) = \frac{1}{N} \sum_{s=1}^{N_s} Y_{s,n} Y_{s,n}^H$$

Figure 7:
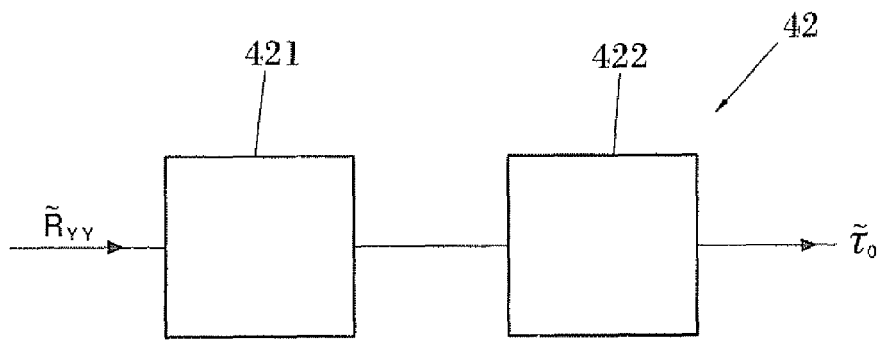
FIG. 7 shows some blocks of the ToA estimation scheme according to an embodiment of the present invention.

Following the stage (41) at which the correlation matrix of the sampled signal in the frequency domain (Y(0),Y(1), ..., Y(K-1)) is obtained, there is a second stage (42) in which ToA is calculated. FIG. 7 shows in detail the second stage (42') for calculating the ToA:

Firstly, calculation of a temporal pseudo-spectrum from said correlation matrix $\tilde{R}_{YY}$ is carried out (421).

In a preferred embodiment of the present invention, but not limited thereto, the temporal pseudo-spectrum (421) proposed for the estimation of the ToA can be obtained by means of the calculation of a temporal pseudo-periodogram, which is defined as follows:

$$P_n(\tau) = e_\tau^H \tilde{R}_{YY}(n) e_\tau \qquad (8)$$

where $\tilde{R}_{YY}(n)$ denotes the correlation matrix of the sampled signal in the frequency domain corresponding to the n-th sample interval, $e_\tau = [1 \; e^{-j\omega_0\tau} \; ... \; e^{-j\omega_0(K-1)\tau}]^T$ denotes a delay-signature vector, and wherein $\omega_0$ is $2\pi/K$, $\tau$ is the temporal delay and K is the number of frequency samples at each observation vector Secondly, a delay value ($\tilde{\tau}_0$) that exceeds a given threshold in the temporal pseudo-spectrum is calculated (422). Said threshold $P_{th}$ is estimated (obtained empirically).

The algorithm for searching said delay value ($\tilde{\tau}_0$) is as follows: A pseudo-periodogram P($\tau$) is built, which is a function that can be evaluated at different temporal values of $\tau$ and at different sample intervals n. Depending on the desired resolution or on the computational load desired, a certain amount of values of $\tau$ is selected. Starting with the first sample interval, n=1, the pseudo-periodogram $P_n(\tau)$ is calculated and the first $\tau=\tau_0$ for which the value of $P_n(\tau_0)$ is over a certain threshold $P_{th}$ is searched. Said value of $\tau=\tau_0$ for which $P_n(\tau_0) > P_{th}$ is the estimated delay $\tilde{\tau}_0$, and therefore the ranging estimate (by simply multiplying $\tau_0$ by the propagation speed) is directly obtained. If no value of $\tau$ exceeding the threshold $P_{th}$ is found, the algorithm continues with the next sample interval and repeats the process. The threshold, $P_{th}$, depends on particular scenarios and is dependent on the noise power at the receiver.

Figure 8:
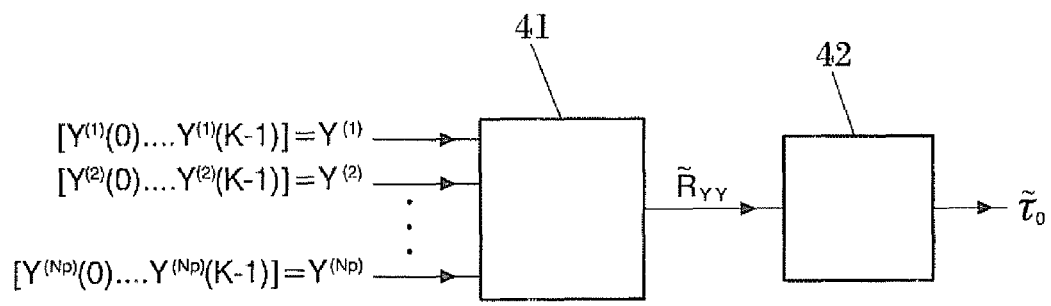
FIG. 8 shows a ToA estimation scheme according to a further embodiment of the present invention.

Next, the ToA estimation algorithm of the present invention is applied for the estimation of the time of arrival of impulse radio ultra wideband signals (IR-UWB). Thus, it is shown how the algorithm exploits the temporal diversity inherent to IR-UWB signals, which transmit $N_p$ pulses with a repetition period of $T_{pr}$ (equations (1) to (3)). This is shown in FIG. 8.

The temporal diversity (repetition of each pulse $N_p$ times) is used for the estimation of the correlation matrix in IR-UWB. For each one of the $N_p$ repeated pulses which are transmitted in an IR signal (see equation (1)), a vector with the corresponding K frequency samples $Y_{s,n}$ is built. This vector is similar to the one already described when the first stage (41) of the ToA estimation scheme was presented. Since each IR signal transmits $N_p$ repeated pulses, $N_p$ frequency vectors (observation vectors) $Y_{s,n}^{(1)} \; ... \; Y_{s,n}^{(N_p)}$ can be built. With these $N_p$ frequency vectors $Y_{s,n}^{(1)} \; ... \; Y_{s,n}^{(N_p)}$ a diversity matrix $Z_{s,n}$ is conformed:

$$Z_{s,n} = [Y_{s,n}^{(1)} \; ... \; Y_{s,n}^{(N_p)}]$$

wherein $Y_{s,n}^{(p)}$ denotes the frequency components associated to received pulse p at realization s and sample interval n and wherein p is a natural number which goes from 1 to $N_p$.

From this diversity matrix $Z_{s,n}$ the correlation matrix $\tilde{R}_{YY}(n)$ is estimated by, $$\tilde{R}_{YY}(n) = \frac{1}{N_s} \sum_{s=1}^{N_s} Z_{s,n} Z_{s,n}^H$$

The exploitation of the temporal diversity of impulse radio ultra wideband signals (IR-UWB) lies therefore in taking into account the observations of $N_p$ received repeated pulses when building the observation, said matrix $Z_{s,n}$, from which a correlation matrix $\tilde{R}_{YY}(n)$ is calculated.

Now, coming back to the temporal pseudo-spectrum obtained by means of a pseudo-periodogram as defined in equation (8), instead of evaluating the pseudo-spectrum (8) at each point over which the search is performed, the invention provides, in a further embodiment, an alternative algorithm, denoted as root-periodogram, which finds the roots of a polynomial, thus reducing the search over a few points. Note that both the previous algorithm and this alternative algorithm can be applied independently from the nature of the received signal, since both algorithms are calculated from the correlation matrix $\tilde{R}_{YY}(H)$ (independently from the way of obtaining this correlation matrix).

The root-periodogram comprises the following steps: calculating a periodogram from the received samples; calculating the roots of a polynomial; selecting a root for that polynomial, said root corresponding to a maximum which is over a previously determined threshold.

The idea is therefore to find the maximum points of the pseudo-spectrum, $$\max\{e_\tau^H \tilde{R}_{YY} e_\tau\} = \max\{\text{trace}(\tilde{R}_{YY} e_\tau e_\tau^H)\} \quad (9)$$

Searching the maxima of (8) is equivalent as searching the maxima of the quadratic form in the numerator $e_\tau^H \tilde{R}_{YY} e_\tau$. Maximizing the numerator is equivalent to maximizing the trace of the matrix in the left-handed expression of (9). Note that the trace of a matrix is the sum of the elements of the diagonal of said.

Denoting $E_p = e_\tau e_\tau^H$ and $\rho = e^{-j\omega_0 \tau}$ the square-matrix $E_\rho$ can be written as:

$$E_\rho = \begin{bmatrix} 1 & \rho^{-1} & \rho^{-2} & \cdots & \rho^{-(K-1)} \\ \rho & 1 & \rho^{-1} & \cdots & \rho^{-(K-2)} \\ \rho^2 & \rho & 1 & \cdots & \rho^{-(K-3)} \\ \vdots & \vdots & \vdots & \ddots & \vdots \\ \rho^{(K-1)} & \rho^{(K-2)} & \cdots & \rho & 1 \end{bmatrix} \quad (10)$$

and the trace can be expressed in terms of the following polynomial, $$\text{trace}(\tilde{R}_{YY} E_\rho) = \sum_{l=0}^{K-1} \sum_{k=0}^{K-1} R_{k,l} \rho^{(k-l)} \quad (11)$$

where $R_{k,l}$ denotes the k-th row, l-th column element of the correlation matrix $\tilde{R}_{YY}$.

The estimation problem is then reduced to finding the roots which correspond to maxima (by evaluating them in the second derivative) of the following polynomial $$\sum_{k=1-K}^{K-1} k D_k \rho^k = 0 \quad (12)$$

where $$D_k = \sum_{i=1}^{K} R_{i-k,i}$$

is defined as the addition of the elements of the n-th diagonal of the correlation matrix $\tilde{R}_{YY}$. The coefficients in the polynomial (12) are calculated by summing the elements of the k-diagonal of the matrix $\tilde{R}_{YY}$.

In summary, the present invention provides a low complexity method for the time-of-arrival (ToA) estimation of a signal transmitted through a wireless system. The method is based on a frequency domain approach, which allows sub-Nyquist sampling rates while to achieving high (centimetre, depends on the implementation) ranging accuracy. The motivation to consider a frequency domain approach is, as already shown, two fold: to allow for lower complexity implementation requirements associated to the receiver architecture and to enable accurate ranging estimation, which can potentially be implemented using high resolution spectral estimation algorithms. Given the inherent high time resolution of the UWB signal, we have considered simpler techniques, such as the periodogram.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A method for estimating a time-of-arrival of a received signal y(t), the method comprising the steps of:
   generating a plurality of frequency-domain samples (Y(0), Y(1), . . . , Y(K−1)) from the received signal y(t);
   estimating a correlation matrix $\tilde{R}_{YY}$ from the plurality of frequency-domain samples;
   calculating a signal energy distribution with respect to different propagation delays from the correlation matrix $\tilde{R}_{YY}$; and
   finding a delay value ($\tilde{\tau}_0$) at which the signal energy distribution exceeds a certain threshold $P_{th}$, the delay value ($\tilde{\tau}_0$) representing the time-of-arrival estimation;
   wherein the signal energy distribution is given by a computation of a pseudo-periodogram;
   wherein the pseudo-periodogram takes the form of $$P_n(\tau) = e_\tau^H \tilde{R}_{YY}(n) e_\tau$$

wherein $\tilde{R}_{YY}(n)$ is the previously estimated correlation matrix of the sampled signal in the frequency domain corresponding to an n-th sample interval, $e_\tau = [1\, e^{-j\omega_0 \tau} \ldots e^{-j\omega_0 (K-1)\tau}]^T$ is a delay-signature vector, and
   wherein $\omega_0 = 2\pi/K$, $\tau$ is the temporal delay and K is the number of frequency samples at each observation vector.

2. The method of claim 1, wherein the step of estimating a correlation matrix $\tilde{R}_{YY}$ is performed by calculating $$\tilde{R}_{YY}(n) = \frac{1}{N_s} \sum_{s=1}^{N_s} Y_{s,n} Y_{s,n}^H$$

wherein n denotes the n-th sampling interval, $N_s$ is the number of realizations observed, and $Y_{s,n} = [Y_{s,n}(0) Y_{s,n}(1) \ldots Y_{s,n}(K-1)]^T$ are the K frequency components of the observation vector at realization s and sample interval n.

3. The method of claim 1, wherein the received signal y(t) is an ultra-wideband signal.

4. The method of claim 3, wherein the ultra-wideband signal is an impulse radio ultra-wideband signal.

5. The method of claim 4, wherein the step of estimating a correlation matrix $\tilde{R}_{YY}$ from a plurality of frequency-domain samples is performed by exploiting a temporal diversity of the impulse radio ultra-wideband signal.

6. The method of claim 5, wherein the step of estimating a correlation matrix $\tilde{R}_{YY}$ is performed by calculating $$\tilde{R}_{YY}(n) = \frac{1}{N_s} \sum_{s=1}^{N_s} Z_{s,n} Z_{s,n}^H$$

wherein n denotes the n-th sampling interval, $N_s$ is the number of realizations observed, $Z_{s,n} = [Y_{s,n}^{(1)} \ldots Y_{s,n}^{(N_p)}]$ is a diversity matrix, wherein $N_p$ is the number of repeated pulses transmitted, the elements of $Y_{s,n}^{(p)}$ are the frequency components associated to received pulse p at realization s and sample interval n, wherein p is a natural number which goes from 1 to $N_p$.

7. A method for estimating a time-of-arrival of a received signal y(t), the method comprising the steps of:
generating a plurality of frequency-domain samples (Y(0), Y(1), ..., Y(K−1)) from the received signal y(t);
estimating a correlation matrix $\tilde{R}_{YY}$ from the plurality of frequency-domain samples;
calculating a signal energy distribution with respect to different propagation delays from the correlation matrix $\tilde{R}_{YY}$; and
finding a delay value $(\tilde{\tau}_0)$ at which the signal energy distribution exceeds a certain threshold $P_{th}$, the delay value $(\tilde{\tau}_0)$ representing the time-of-arrival estimation;
wherein the step of finding the delay value $(\tilde{\tau}_0)$ is performed by calculating the roots of a polynomial:
wherein the polynomial takes the form of $$\sum_{k=1-K}^{K-1} k D_k \rho^k = 0$$

where $$D_k = \sum_{l=1}^{K} R_{l-k,l}$$

is the addition of the elements of the n-th diagonal of the correlation matrix $\tilde{R}_{YY}$ and $\rho = e^{-j\omega_0 \tau}$,
wherein $\omega_0 = 2\pi/K$, and $\tau$ is the temporal delay.

8. The method of claim 7, wherein the signal energy distribution is given by a computation of a pseudo-periodogram;
wherein the pseudo-periodogram takes form of $$P_n(\tau) = e_\tau^H \tilde{R}_{YY}(n) e_\tau$$

wherein $\tilde{R}_{YY}(n)$ is the previously estimated correlation matrix of the sampled signal in the frequency domain corresponding to an n-th sample interval, $e_\tau = [1 e^{-j\omega_0 \tau} \ldots e^{-j\omega_0(K-1)\tau}]^T$ is a delay-signature vector, and
wherein $\omega_0 = 2\pi/K$, $\tau$ is the temporal delay and K is the number of frequency samples at each observation vector.

9. The method of claim 7, wherein the received signal y(t) is an ultra-wideband signal.

10. The method of claim 9, wherein the ultra-wideband signal is an impulse radio ultra-wideband signal.

11. The method of claim 10, wherein the step of estimating a correlation matrix $\tilde{R}_{YY}$ from a plurality of frequency-domain samples is performed by exploiting a temporal diversity of the impulse radio ultra-wideband signal.

12. The method of claim 11, wherein the step of estimating a correlation matrix $\tilde{R}_{YY}$ is performed by calculating $$\tilde{R}_{YY}(n) = \frac{1}{N_s} \sum_{s=1}^{N_s} Z_{s,n} Z_{s,n}^H$$

wherein n denotes the n-th sampling interval, $N_s$ is the number of realizations observed, $Z_{s,n} = [Y_{s,n}^{(1)} \ldots Y_{s,n}^{(N_p)}]$ is a diversity matrix, wherein $N_p$ is the number of repeated pulses transmitted, the elements of $Y_{s,n}^{(p)}$ are the frequency components associated to received pulse p at realization s and sample interval n, wherein p is a natural number which goes from 1 to $N_p$.

13. The method of claim 7, wherein the step of estimating a correlation matrix $\tilde{R}_{YY}$ is performed by calculating $$\tilde{R}_{YY}(n) = \frac{1}{N_s} \sum_{s=1}^{N_s} Y_{s,n} Y_{s,n}^H$$

wherein n denotes the n-th sampling interval, $N_s$ is the number of realizations observed, and $Y_{s,n} = [Y_{s,n}(0) Y_{s,n}(1) \ldots Y_{s,n}(K-1)]^T$ are the K frequency components of the observation vector at realization s and sample interval n.

14. A method for estimating a time-of-arrival of a received signal y(t), the method comprising the steps of:
generating a plurality of frequency-domain samples (Y(0), Y(1), ..., Y(K−1)) from the received signal y(t);
estimating a correlation matrix $\tilde{R}_{YY}$ from the plurality of frequency-domain samples;
calculating a signal enemy distribution with respect to different propagation delays from the correlation matrix $\tilde{R}_{YY}$; and
finding a delay value $(\tilde{\tau}_0)$ at which the signal energy distribution exceeds a certain threshold $P_{th}$, the delay value $(\tilde{\tau}_0)$ representing the time-of-arrival estimation;
wherein the step of generating a plurality of frequency-domain samples (Y(0), Y(1), ..., Y(K−1)) from the received signal y(t) is performed by
splitting the received signal y(t) into a plurality of bands by filtering the received signal by band-pass filters (25-1, ..., 25-N) with approximately Gaussian frequency response;
sampling (28-1, ..., 28-N) the output of each of the band-pass filters thereby obtaining a plurality of samples (S(0), S(1), ..., S(N−1));
from the plurality of samples (S(0), S(1), ..., S(N−1)), building a vector S such that S=[S(0)S(1)...S(N−1)];
from the vector S, creating a vector S' such that S'=[S(N−1)S(N−2)...S(0)]; and
creating a vector Y which is the concatenation of vector S, a vector of zeros of size Q, where Q≧1 and vector S'.

15. Method according to claim 14, wherein vector Y further comprises at least one element equal to zero at each of the extremes of the vector Y.

16. The method of claim 14, wherein the signal energy distribution is given by a computation of a pseudo-periodogram;
wherein the pseudo-periodogram takes form of $$P_n(\tau) = e_\tau^H \tilde{R}_{YY}(n) e_\tau$$

wherein $\tilde{R}_{YY}(n)$ is the previously estimated correlation matrix of the sampled signal in the frequency domain corresponding to an n-th sample interval, $e_\tau=[1e^{-j\omega_0\tau} \ldots e^{-j\omega_0(K-1)\tau}]^T$ is a delay-signature vector, and wherein $\omega_0=2\pi/K$, $\tau$ is the temporal delay and K is the number of frequency samples at each observation vector.

17. The method of claim 14, wherein the received signal y(t) is an ultra-wideband signal.

18. The method of claim 17, wherein the ultra-wideband signal is an impulse radio ultra-wideband signal.

19. The method of claim 18, wherein the step of estimating a correlation matrix $\tilde{R}_{YY}$ is performed by calculating $$\tilde{R}_{YY}(n) = \frac{1}{N_s}\sum_{s=1}^{N_s} Z_{s,n}Z_{s,n}^H$$

wherein n denotes the n-th sampling interval, $N_s$ is the number of realizations observed, $Z_{s,n}=[Y_{s,n}^{(1)} \ldots Y_{s,n}^{(N_p)}]$ is a diversity matrix, wherein $N_p$ is the number of repeated pulses transmitted, the elements of $Y_{s,n}^{(p)}$ are the frequency components associated to received pulse p at realization s and sample interval n, wherein p is a natural number which goes from 1 to $N_p$.

20. The method of claim 14, wherein the step of estimating a correlation matrix $\tilde{R}_{YY}$ is performed by calculating $$\tilde{R}_{YY}(n) = \frac{1}{N_s}\sum_{s=1}^{N_s} Y_{s,n}Y_{s,n}^H$$

wherein n denotes the n-th sampling interval, $N_s$ is the number of realizations observed, and $Y_{s,n}=[Y_{s,n}(0)Y_{s,n}(1) \ldots Y_{s,n}(K-1)]^T$ are the K frequency components of the observation vector at realization s and sample interval n.

* * * * *